United States Patent
Zhu et al.

(10) Patent No.: US 8,620,341 B2
(45) Date of Patent: Dec. 31, 2013

(54) METHOD AND APPARATUS FOR ADJUSTING BANDWIDTH ALLOCATIONS IN A WIRELESS NETWORK

(75) Inventors: Chenxi Zhu, Palo Alto, CA (US);
Wei-Peng Chen, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 269 days.

(21) Appl. No.: 13/149,400

(22) Filed: May 31, 2011

(65) Prior Publication Data

US 2011/0256878 A1    Oct. 20, 2011

Related U.S. Application Data

(63) Continuation-in-part of application No. PCT/US2011/020911, filed on Jan. 12, 2011, and a continuation-in-part of application No. PCT/US2011/020912, filed on Jan. 12, 2011.

(60) Provisional application No. 61/323,209, filed on Apr. 12, 2010.

(51) Int. Cl.
*H04W 72/00* (2009.01)
*H04L 1/00* (2006.01)
*H04W 4/00* (2009.01)

(52) U.S. Cl.
USPC ..... 455/453; 455/450; 455/452.1; 455/452.2; 370/236.1; 370/329

(58) Field of Classification Search
USPC ........................................... 455/450
See application file for complete search history.

(56) References Cited

U.S. PATENT DOCUMENTS

| 6,611,500 B1 * | 8/2003 | Clarkson et al. | 370/252 |
| 8,140,104 B2 * | 3/2012 | Douglas et al. | 455/522 |
| 2010/0118844 A1 | 5/2010 | Jiao et al. | 370/338 |
| 2010/0246482 A1 | 9/2010 | Erceg et al. | 370/328 |

FOREIGN PATENT DOCUMENTS

| EP | 1 098 546 A2 | 5/2001 | H04Q 7/36 |
| EP | 2 106 171 A1 | 9/2009 | H04W 16/14 |
| WO | WO 2011/060310 A1 | 5/2011 | H04W 16/04 |

OTHER PUBLICATIONS

Extended European search report issued by the EPO; Application No. 12150811.3-2412, Mar. 26, 2012.

* cited by examiner

*Primary Examiner* — Huy C Ho
(74) *Attorney, Agent, or Firm* — Baker Botts L.L.P.

(57) ABSTRACT

In accordance with particular embodiments, a method includes providing one or more network tuning constants associated with one or more base stations of a wireless network. The network tuning constants are configured to adjust an equilibrium point of a first bandwidth allocation among the one or more base stations. The method also includes receiving one or more signal performance values from each of the one or more base stations in the wireless network. The method further includes determining whether at least one of the one or more network tuning constants needs to be adjusted. The method additionally includes, upon determining that at least one of the one or more network tuning constants needs to be adjusted, adjusting the one or more network tuning constants based at least in part on the one or more signal performance values.

21 Claims, 2 Drawing Sheets

METHOD AND APPARATUS FOR ADJUSTING BANDWIDTH ALLOCATIONS IN A WIRELESS NETWORK

RELATED APPLICATION

The present application is a Continuation-in-Part of International Application No. PCT/US2011/020911, filed Jan. 12, 2011 entitled "Method and Apparatus for Centralized Allocation of Bandwidth in a Wireless Network" and International Application No. PCT/US2011/020912, filed Jan. 12, 2011 entitled "Method and Apparatus for Locally Managed Allocation of Bandwidth in a Wireless Network," which both International Applications claim the benefit of U.S. Provisional Application Ser. No. 61/323,209, entitled "Distributed and Hybrid Control for Wireless Networks," filed Apr. 12, 2010.

TECHNICAL FIELD

The present disclosure relates generally to methods and apparatuses for adjusting bandwidth allocations in a wireless network.

BACKGROUND

Various wireless technologies (e.g., 3G, 4G, 3GPP Long Term Evolution (LTE), LTE-Advanced (LTE-A), WiMAX, etc.) allow for the use of small, user installed, base stations, generally referred to as femto base stations (also known as femtocells in WiMAX or Home node-B in 3GPP). A femto base station may be provided to a user by a wireless service provider (WSP). A femto base station may be a miniature base station that a user may install in a home or office to enhance signal strength and service quality to endpoints such as wireless phones or netbooks. The user installs the femto base station in their home or office, generally referred to herein as a home or home location, to increase the quality and signal strength of the local wireless coverage. The femto base station's backhaul connection to the WSP's network (WSPN) is provided via the user's home network access (e.g., DSL). The femto base station operates in a similar wireless fashion (e.g., uses the same licensed frequency band) to the WSP's macro base stations. Because, a femto base station operates in a similar wireless fashion to a macro base station, it may be possible for an endpoint to use the same wireless service to establish a connection through the femto base station.

SUMMARY OF THE DISCLOSURE

The teachings of the present disclosure relate to methods and systems in which, in accordance with particular embodiments, a method includes providing one or more network tuning constants associated with one or more base stations of a wireless network. The network tuning constants are configured to adjust an equilibrium point of a first bandwidth allocation among the one or more base stations. The method also includes receiving one or more signal performance values from each of the one or more base stations in the wireless network. The method further includes determining whether at least one of the one or more network tuning constants needs to be adjusted. The method additionally includes, upon determining that at least one of the one or more network tuning constants needs to be adjusted, adjusting the one or more network tuning constants based at least in part on the one or more signal performance values.

Technical advantages of particular embodiments include providing a bandwidth updating algorithm that allows a service provider to adjust the performance of one or more femto base stations. Accordingly, the service provider may provide varying levels of service. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Figure 1:
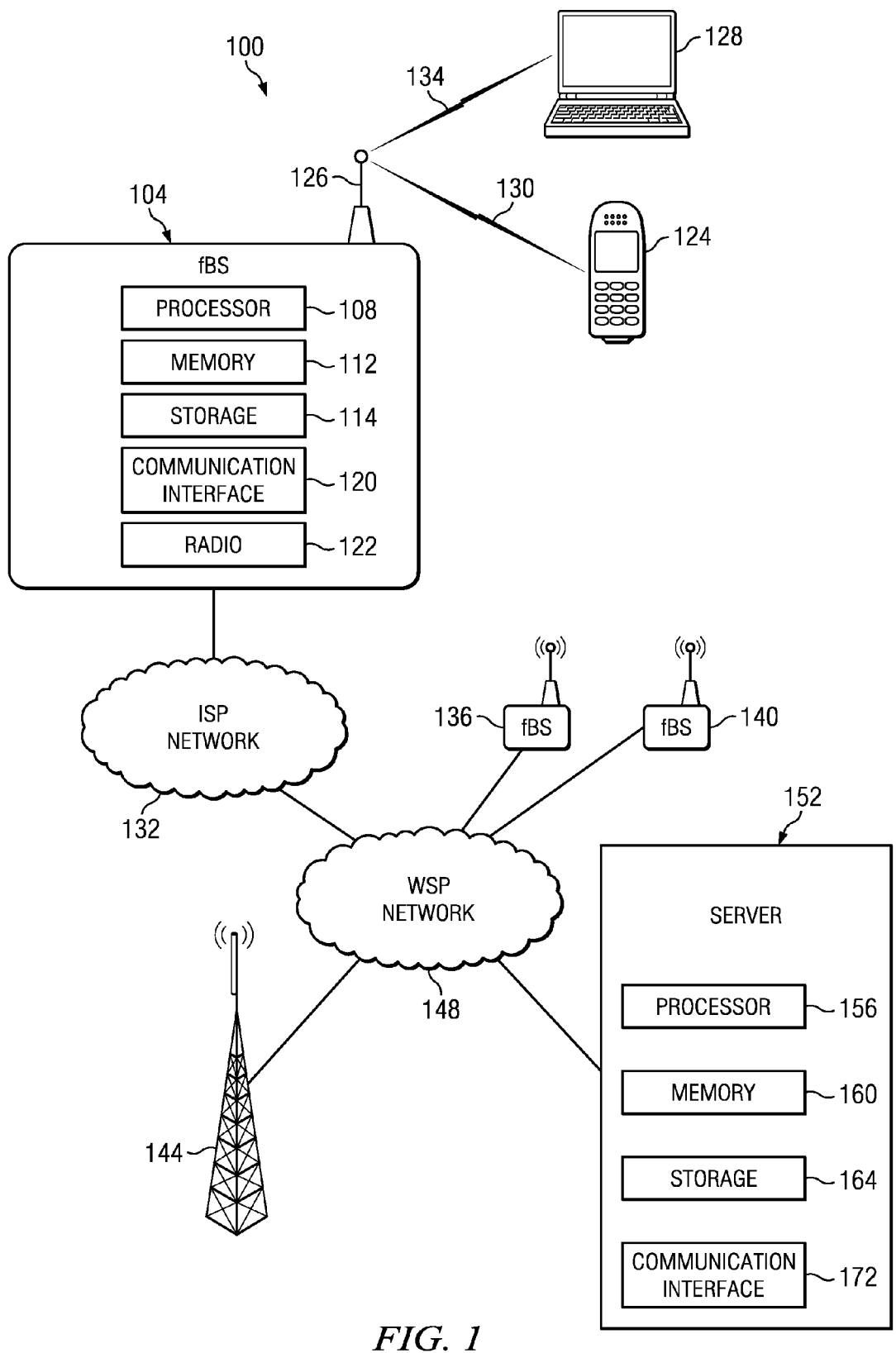
FIG. 1 depicts an example of a system for adjusting bandwidth allocations in a wireless network in accordance with particular embodiments.
Figure 2:
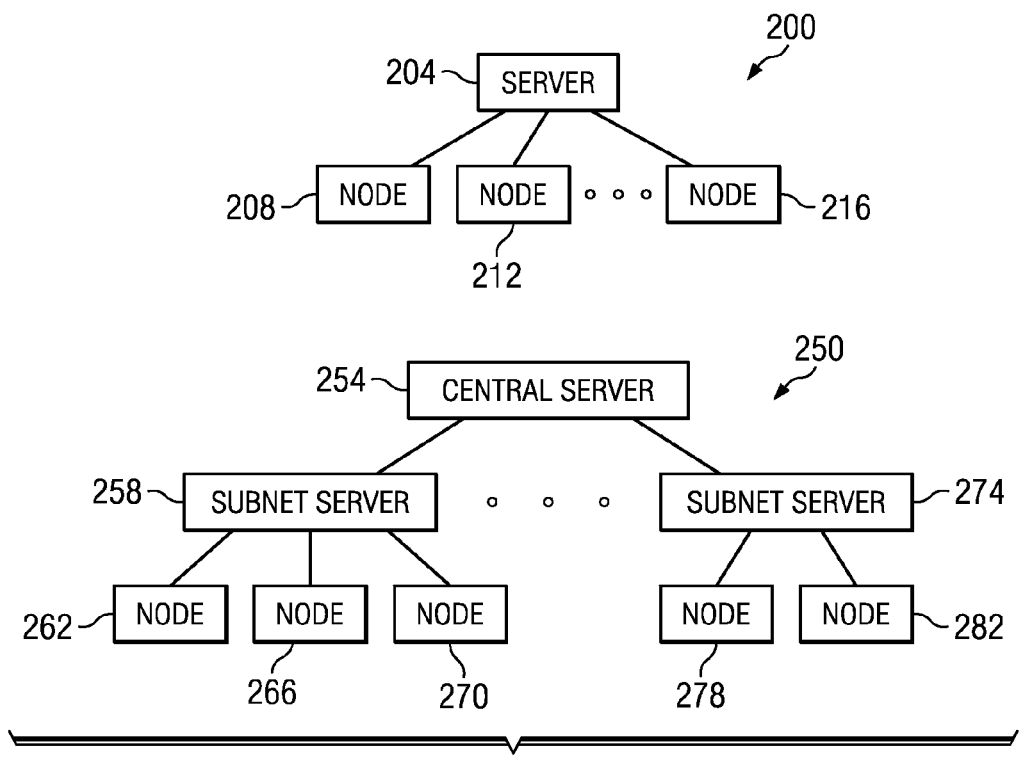
FIG. 2 depicts examples of network topologies for adjusting bandwidth allocations in a wireless network in accordance with particular embodiments.
Figure 3:
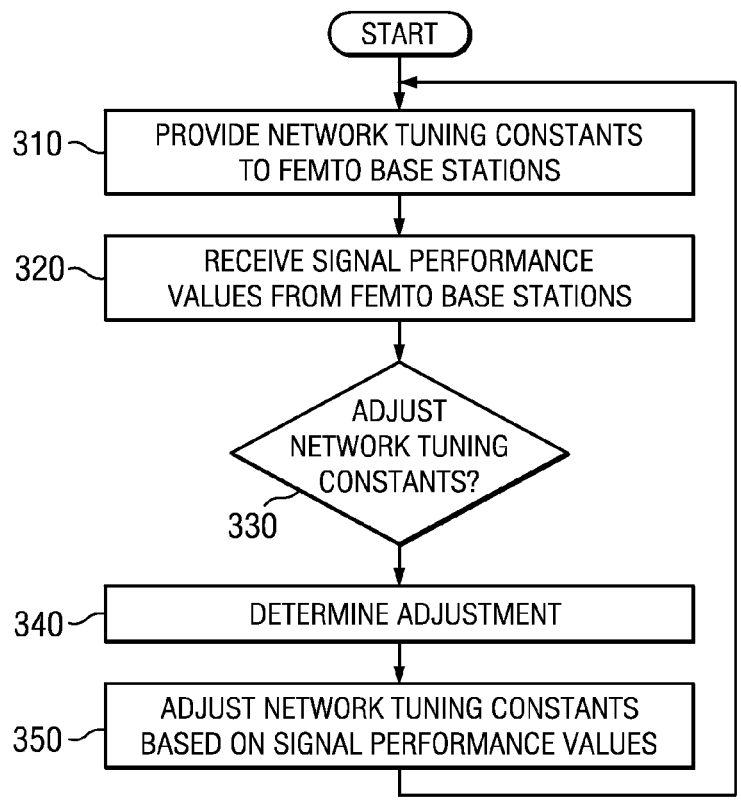
FIG. 3 depicts an example of a method for adjusting bandwidth allocations in a wireless network in accordance with particular embodiments.

Embodiments and their advantages are best understood by referring to FIGS. 1-3 of the drawings, like numerals being used for like and corresponding parts of the various drawings.

FIG. 1 depicts an example of a system 100 for adjusting bandwidth allocations in a wireless network. In the embodiment depicted in FIG. 1, system 100 includes femto base stations 104, 136, and 140, macro base station (MBS) 144, endpoints 124 and 128, Internet service provider (ISP) network 132, wireless service provider (WSP) network 148, and server 152 coupled as shown. Femto base station (fBS) 104 may be operable to communicate wirelessly with one or more endpoints 124 and 128 using a first frequency bandwidth. Femto base station 104 may have determined the first frequency bandwidth based on one or more network tuning constants received from server 152. The network tuning constants may be supplied by server 152 to all the femto base stations (e.g., femto base stations 104, 136, and 140) in system 100. The values of the network tuning constants may impact the equilibrium point of system 100. The equilibrium point may reflect the point at which the wireless resource usage converges for femto base stations 104, 136 and 140. The equilibrium point may lie somewhere in the range between rate fair (the femto base stations provide an approximately equal amount of data throughput) and resource fair (the femto base stations provide an approximately equal amount of wireless resources). Femto base station 104 may receive a measurement of a signal performance from one or more of endpoints 124 and 128. Femto base station 104 may communicate an indication of the signal performance to server 152. Server 152 may determine from at least the indication of signal performance that one or more network tuning constants should be changed. Server 152 may then determine and transmit updated network tuning constants to femto base stations 104, 136, and 140. Femto base station 104 may use updated network tuning constants to determine, either directly or indirectly, a second frequency bandwidth to use to communicate wirelessly with one or more endpoints 124 and 128. Femto base station 104 may then communicate wirelessly with at least one of endpoints 124 and 128 using the second frequency bandwidth.

Femto base station 104 may be any suitable device that is operable to communicate wirelessly with one or more endpoints, such as 124 or 128. Although particular types of base stations are shown, other embodiments may include any combination of macro, micro, pico, femto base stations, and/or any other types of base stations and/or relay stations. In particular embodiments, any of these base stations and/or relay stations may be operable to perform some or all of the functions of femto base station 104 and/or server 152, as described herein.

In some embodiments, femto base station 104 may be connected to WSP network 148 through a user's ISP connection from his home or office through ISP network 132. Because femto base station 104 uses the user's network (at home, in the office, or any other location where the user can access the Internet or WSP network 148), the WSP may not need to provide backhaul access from femto base station 104 to WSP network 148. The WSP and the ISP may be the same or different entities with or without a special agreement related to femto base station 104. Depending on the scenario, femto base station 104 may be configured to serve either a closed subscription group (CSG) (e.g., the owner of the base station determines who may access the base station) or an open subscription group (OSG) (e.g., any endpoint with an active service contract with the WSP may access the base station).

In some embodiments, a WSP's wireless network may include numerous femto base stations that are coupled to WSP network 148. Because the femto base stations are purchased and installed by users, the WSP may have little control over the exact locations and/or the densities of these devices. Because each user and/or home location may have its own respective femto base station (such as femto base station 104), there may be a relatively high concentration of femto base stations within a given area (e.g., an apartment complex). In some embodiments, a femto base station may use the same licensed spectrum (e.g., the spectrum licensed by the user's WSP) as the local macro base stations (e.g., macro base station 144) and relay stations (not depicted) of the WSP. Thus, in some cases, multiple femto base stations may share a common wireless channel due to the limited amount of frequency spectrum available for wireless communication. These factors may increase the chance and/or severity of wireless interference between nearby femto base stations and/or other base stations or relay stations, which in turn may inhibit the performance of a femto base station and/or other base station or relay station affected by the interference.

One way to reduce the interference between femto base stations is to control the frequency bandwidth allocated to each femto base station. Frequency bandwidth may refer to an amount of a frequency spectrum that is used for wireless communication. In some embodiments, a frequency bandwidth may be specified by an absolute amount (such as 5 MHz) or a relative amount (such as ⅓ of an available frequency channel). As an example, a femto base station may be configured to use a third of the bandwidth of the appropriate wireless channel. If the wireless channel was 6 MHz, the femto base station would be configured to use a frequency bandwidth of 2 MHz.

Controlling the frequency bandwidths of femto base stations using traditional network planning techniques may not be particularly suitable in a network with a large number of femto base stations due to the cost and the difficulty of obtaining detailed geometry and propagation information for the femto base stations. Moreover, because a user has control over a femto base station, the user may turn it on or off at any give time, or may move the femto base station to a different location. This may potentially outdate information used to plan the network. Thus, an operator of a network with many femto base stations may desire to configure and/or optimize the network in real time.

In some embodiments, a method for tuning frequency bandwidth allocations in a network may be provided. In certain embodiments, femto base station 104 may not communicate with other base stations (such as femto base stations 136 or 140) of the WSP's network and may be considered a player in a non-cooperative game trying to maximize its own benefit. In such embodiments, each femto base station may balance a data throughput gain against a cost associated with increasing the amount of frequency bandwidth used. In some embodiments, femto base station 104 may adjust the amount of frequency bandwidth that it is using to communicate with one or more of endpoints 124 or 128 based on, for example, a bandwidth updating algorithm that takes into account the quality of the signals 130 and 134 between femto base station 104 and endpoints 124 and 128, and a cost per unit of frequency bandwidth. In some embodiments, the algorithm may also take into account one or more network tuning constants. These tuning constants may be adjusted, for example by server 152, to adjust the equilibrium point of femto base stations 104, 136, and 140. Femto base station 104 may update its frequency bandwidth periodically using the bandwidth updating algorithm. In some embodiments, when a plurality of base stations in a network update their respective frequency bandwidths in a similar fashion, the network as a whole may converge to a unique Nash equilibrium of the non-cooperative game (e.g., where every base station will operate at its optimal frequency bandwidth at Pareto optimality). For example, in a network with a plurality of femto base stations, a frequency bandwidth set comprising the frequency bandwidth of each femto base station may approach and/or converge to a Nash equilibrium. In various embodiments, the bandwidth updating algorithm may be used by femto base stations or any other suitable base station. The Nash equilibrium point may be adjusted by updating the network tuning constants used by the femto base stations.

Various components shown in FIG. 1 (e.g., femto base stations 104, 136, 140, macro base station 144, server 152, and endpoints 124 and 128) may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein or provide functionality described or illustrated herein.

The components of one or more computer systems may comprise any suitable physical form, configuration, number, type and/or layout. As an example, and not by way of limitation, one or more computer systems may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems may be unitary or distributed; span multiple locations; span multiple machines; or reside in a cloud, which may include one or more cloud components in one or more networks.

Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

In particular embodiments, a computer system may include a processor, memory, storage, and a communication interface. As an example, a femto base station (such as femto base station 104) may comprise a computer system that includes processor 108, memory 112, storage 114, and communication interface 120. These components may work together in order to provide base station functionality, such as increasing the efficiency with which the available wireless resources are used. More specifically, the components of femto base station 104 may allow femto base station 104 to select and use particular settings for its wireless connection or connections (such as 130 and 134) with one or more endpoints (such as 124 and 128) based on, for example, network tuning constants from server 152 and one or more signal performance measurements from endpoints 124 and/or 128.

Processor 108 may be a microprocessor, controller, or any other suitable computing device, resource, or combination of hardware, stored software and/or encoded logic operable to provide, either alone or in conjunction with other femto base station 104 components, such as memory 112, femto base station functionality. Such functionality may include providing various wireless features discussed herein to an endpoint, base station, and/or relay station. Certain features provided by femto base station 104 via, in part, processor 108 may allow system 100 to support more endpoints and/or provide improved quality of service, as compared to a traditional wireless network.

Memory 112 may be any form of volatile or non-volatile memory including, without limitation, magnetic media, optical media, random access memory (RAM), read-only memory (ROM), flash memory, removable media, or any other suitable local or remote memory component or components. Memory 112 may store any suitable data or information utilized by femto base station 104, including software embedded in a computer readable medium, and/or encoded logic incorporated in hardware or otherwise stored (e.g., firmware).

Storage 114 may be any form of volatile or non-volatile memory including, without limitation, magnetic media, optical media, random access memory (RAM), read-only memory (ROM), flash memory, removable media, or any other suitable local or remote memory component or components. Storage 114 may store any suitable data or information utilized by femto base station 104, including software embedded in a computer readable medium, and/or encoded logic incorporated in hardware or otherwise stored (e.g., firmware). In some embodiments, data may be loaded from storage 114 and stored in memory 112, or loaded from memory 112 and stored in storage 114.

In some embodiments, memory 112 may store information used by processor 108 in determining parameters for a wireless connection. Memory 112 may also store the results and/or intermediate results of the various calculations and determinations performed by processor 108. In some embodiments, memory 112 may also store information regarding the wireless connection being used by each endpoint (such as 124 and 128) connected to femto base station 104.

Femto base station 104 may also comprise communication interface 120 which may be used for the communication of signaling and/or data between femto base station 104 and one or more networks (such as ISP network 132 or WSP network 148). For example, communication interface 120 may perform any formatting or translating that may be needed to allow femto base station 104 to send and receive data to and from ISP network 132 over a wired connection. Communication interface 120 may also be used to establish any wired connections between femto base station 104 and other networks or network components. In particular embodiments, communication interface 120 may provide a backhaul connection to the WSP's network 148 via the user's internet access supplied by an ISP (which may be the same or a different entity than the WSP).

In some embodiments, components of system 100 (e.g., femto base stations 104, 136, and 140, macro base station 144, and endpoints 124 and 128) may also comprise a radio and antenna for wireless communication. As an example, femto base station 104 comprises a radio 122 that may be coupled to or a part of antenna 126. Radio 122 may receive digital data that is to be sent out to other base stations, relay stations, and/or endpoints via a wireless connection (such as 130). The wireless connection may use the wireless resources assigned to or by femto base station 104. The wireless resources may include, for example, a combination of one or more of a center frequency, frequency bandwidth, time slot, channel, and/or sub-channel. In particular embodiments, this information may be stored in memory 112. Radio 122 may convert the digital data into a radio signal having the appropriate center frequency and bandwidth parameters. These parameters may have been determined ahead of time by some combination of processor 108 and memory 112. The radio signal may then be transmitted via antenna 126 for receipt by any appropriate component or device (e.g., endpoint 124). Similarly, radio 122 may convert radio signals received from antenna 126 into digital data to be processed by processor 108.

Antenna 126 may be any type of antenna capable of transmitting and receiving data and/or signals wirelessly. In some embodiments, antenna 126 may comprise one or more omnidirectional, sector or panel antennas operable to transmit/receive radio signals between 2 GHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Radio 122 and antenna 126 may collectively form a wireless interface. This wireless interface may be used to establish connections with various wireless components, including endpoints and relay stations.

Endpoints 124 and 128 may be any type of endpoints operable to wirelessly send and receive data and/or signals to and from femto base station 104. Some possible types of endpoints 124 may include desktop computers, PDAs, cell phones, laptops, and/or VoIP phones. In some embodiments, endpoint 124 may comprise a processor, memory, storage, radio, antenna, and/or other components that enable the functionality of endpoint 124. In some embodiments, these components may work together in order to provide endpoint functionality, such as communicating with femto base station 104. In some embodiments, the components of endpoint 124 may allow endpoint 124 to detect various factors and determine a signal performance associated with wireless connection 130 between endpoint 124 and femto base station 104. This information may then be communicated to femto base station 104 using any of a variety of reporting techniques.

A processor of endpoint 124 may provide various wireless features discussed herein to endpoint 124. For example, in particular embodiments, a processor may be able to determine a signal performance measurement, such as a signal to interference and noise ratio (SINR). In some embodiments, information relating to signal performance (e.g., signal strength, interference, and noise) may be provided by a wireless interface (e.g., a radio and antenna) of the endpoint.

A memory of the endpoint 124 may store any suitable data or information utilized by the endpoint. In some embodiments, memory may store information used by the endpoint's processor in determining the signal performance. For example, a memory may store parameters, measurements, and/or other information collected by endpoint 124 that relates to the quality of wireless connection 130. A memory may also store the results and/or intermediate results of the various calculations and determinations performed by the endpoint's processor.

Endpoint 124 may also comprise a radio that is coupled to or a part of an antenna to send/receive digital data to/from, for example, femto base station 104 via a wireless connection 130. In particular embodiments, information related to the wireless connection 130 (e.g., the wireless resources assigned to endpoint 124) may be stored in a memory of endpoint 124. The radio may convert digital data into a radio signal having the appropriate center frequency and bandwidth parameters. These parameters may have been determined ahead of time and stored in the endpoint's memory. The radio signal may then be transmitted for receipt by any appropriate component or device (e.g., femto base station 104). Similarly, the endpoint's radio may convert radio signals received from a device (e.g., femto base station 104) into digital data to be processed by the endpoint's processor.

In the embodiment depicted, system 100 also includes server 152. Server 152 may assist in the management of radio resources used by the base stations of WSP network 148. In particular embodiments, server 152 may be a SON server. In some embodiments, server 152 may be operable to perform any calculations described herein on behalf of one or more femto base stations 104, 136, and 140, macro base station 144, another base station, a relay station, or another server. In some embodiments, server 152 may provide one or more frequency bandwidths and/or network tuning constants for one or more base stations and/or relay stations of a network. Server 152 may comprise a computer system that includes processor 156, memory 160, storage 164, and communication interface 170. These components may work together in order to provide server functionality (e.g., SON server functionality), such as adjusting how the available wireless resources are used. In some embodiments, the components of server 152 may allow server 152 to provide both global and local adjustments to the network tuning constants of the femto base stations (e.g., femto base station 104). The global adjustments to the network tuning constants may be uniformly applicable to all the femto base stations, whereas the local adjustments to the network tuning constants may be directed to specific femto base stations. This may allow a wireless service provide great flexibility in how its wireless resources are used. For example, the wireless service provider may provide better service to certain customers who pay higher fees or increase the service to femto base stations within a particular area during a particular event (e.g., a convention, sporting event, concert, parade, etc.).

In certain embodiments, the components of server 152 may also allow server 152 to select particular settings for the wireless connections of femto base stations 104, 136, 140, and/or macro base station 144 of the WSP network 148.

Processor 156 may be a microprocessor, controller, or any other suitable computing device, resource, or combination of hardware, stored software and/or encoded logic operable to provide, either alone or in conjunction with other server 152 components, such as memory 160, server functionality. Such functionality may include managing various wireless features discussed herein for a base station or other network component. Certain features provided by server 152 via, in part, processor 156 may allow system 100 to support more base stations and/or provide improved quality of service, as compared to a traditional wireless network. For example, processor 156 may calculate a frequency bandwidth and/or a network tuning constant. In certain embodiments, server 152 may provide certain femto base stations with additional resources based on a subscription plan or special event. For example, if a user subscribes to a higher service plan, server 152 may provide the respective femto base station with one or more network tuning constants that increase the frequency bandwidth for that femto base station.

Memory 160 may be any form of volatile or non-volatile memory including, without limitation, magnetic media, optical media, random access memory (RAM), read-only memory (ROM), flash memory, removable media, or any other suitable local or remote memory component or components. Memory 160 may store any suitable data or information utilized by server 152, including software embedded in a computer readable medium, and/or encoded logic incorporated in hardware or otherwise stored (e.g., firmware). In some embodiments, memory 160 may store information (e.g., a signal performance measurement) used by processor 156 in determining parameters for a wireless connection, such as a frequency bandwidth or a network tuning constant. Memory 160 may also store the results and/or intermediate results of the various calculations and determinations performed by processor 156. In some embodiments, memory 160 may store information which may be used in determining which femto base stations should be able to use more frequency bandwidth. For example, memory 160 may comprise a table, database, or other collection of data, that identifies the location and timing of major events and/or that lists users who have subscribed to a higher or lower level of service.

Storage 164 may be any form of volatile or non-volatile memory including, without limitation, magnetic media, optical media, random access memory (RAM), read-only memory (ROM), flash memory, removable media, or any other suitable local or remote memory component or components. Storage 164 may store any suitable data or information utilized by server 152, including software embedded in a computer readable medium, and/or encoded logic incorporated in hardware or otherwise stored (e.g., firmware). In some embodiments, data may be loaded from storage 164 and stored in memory 160, or loaded from memory 160 and stored in storage 164.

Server 152 may also comprise communication interface 172 which may be used for the communication of signaling and/or data between server 152 and one or more networks (such as ISP network 132 or WSP network 148) and/or network components, such as femto base stations 104, 136, 140, and macro base station 144. For example, communication interface 172 may perform any formatting or translating that may be needed to allow server 152 to send and receive data to and from WSP network 148 over a wired connection. Communication interface 172 may also be used to establish any wired connections between server 152 and other networks or network components.

System 100 may comprise a network that includes various networks, such as ISP network 132 and WSP network 148. In some embodiments, a network may comprise one or more networks, such as the Internet, a LAN, WAN, MAN, PSTN, or some combination of the above. In certain embodiments, ISP network 132 may be coupled to WSP network 148 via one or more networks, including but not limited to, the Internet, a LAN, WAN, MAN, PSTN, or some combination of the above. In some embodiments, an ISP may provide a user with his home network access. A user may use the ISP network 132 for home network access at the user's home location. In providing the user with home network access, the ISP network 132 may include modems, servers, gateways (e.g., an ISP gateway), and/or other suitable components. In some embodiments, ISP network 132 may provide backhaul access from a base station (such as 104) to WSP network 148.

In particular embodiments, WSP network 148 may comprise various servers (such as 152), gateways, switches, routers, and other nodes used in providing wireless service. In some embodiments, the servers may comprise one or more servers, such as Operation, Administration, Maintenance and Provisioning (OAM&P) servers, Network Access Provider (NAP) servers, AAA servers, Self Organizing Network (SON) servers, or any other servers that the WSP may need to configure/authenticate one or more base stations (such as 104) and provide users with wireless service. The WSP's gateways may comprise any hardware and/or software needed to couple WSP network 148 with ISP network 132. For example, in particular embodiments, the gateway may comprise a security gateway and, behind the security gateway, an ASN gateway. In some embodiments, the WSP network 148 may support and/or implement orthogonal frequency-division multiple access (OFDMA).

In various embodiments, WSP network 148 may comprise various types of relay stations and/or base stations, such as a macro, micro, pico, femto, or other type of base station. In some embodiments, the bandwidth updating algorithm may be used by any of these base stations. In some embodiments, one or more calculations involved in implementing the bandwidth updating algorithm may be performed by femto base station 104, server 152, or other suitable component of the network.

In some embodiments, various base stations (e.g., the macro base stations) of the network may be optimized through planning and tuning, rather than through a bandwidth updating algorithm as described herein. In various embodiments, a plurality of base stations of the network may use a common bandwidth updating algorithm, even if they are different types of base stations (e.g., pico and femto).

System 100 may also include femto base stations 104, 136, 140, and macro base station 144 and/or other wireless communication devices that produce interference during wireless communication between, for example, femto base station 104 and its endpoints 124 and 128. Limited frequency spectrum allocated for wireless communication and a high density of base stations (e.g., femto base stations) in a network may intensify this interference, leading to loss of signal and/or quality of service. In some embodiments, network performance may be improved through a bandwidth updating algorithm used by the base stations (such as femto base stations 104, 136, and 140, and/or macro base station 144) of a network.

In some embodiments, femto base station 104 may be a base station "i" of a network comprised of "N" base stations operating in the same frequency channel. In some embodiments, femto base station 104 may communicate wirelessly for a period of time with at least one endpoint 124 (and/or 128) using a first frequency bandwidth. For example, femto base station 104 may use all or a portion of a frequency channel with a bandwidth of 10 Megahertz (MHz). The normalized bandwidth used by femto base station 104 may be represented as $w_i$. For example, femto base station 104 with a normalized bandwidth $w_i=0.5$ may wirelessly communicate using a first frequency bandwidth of 5 MHz of the 10 MHz channel.

In some embodiments, the first frequency bandwidth does not have to be contiguous. For example, in an OFDMA scheme, a frequency channel may comprise various frequency subcarriers. In some embodiments, the average transmission power per subcarrier may be fixed. In some embodiments, femto base station 104 may randomly (e.g., pseudo-randomly) select frequency subcarriers from the frequency channel. This may allow the interference produced by femto base station 104 (and other base stations employing this technique) to be spread across one or more frequency channels used by femto base station 104.

In some embodiments, a base station may use a set of frequency subcarriers for a first period of time, a different set of frequency subcarriers for a second period of time, and so on. In some embodiments, the frequency subcarriers may or may not be contiguous. In some embodiments, a base station may use various subcarriers by occupying a subset of physical resource blocks in an LTE communication scheme or a subset of PUSC subchannels in a WiMAX communication scheme.

As femto base station 104 communicates wirelessly with at least one endpoint 124 for a period of time, endpoint 124 may measure the signal performance of the wireless communication. For example, the endpoint 124 may perform an SINR calculation for the wireless signal from femto base station 104 to the endpoint 124 or other suitable measurement that determines a quality of the wireless signal. The signal performance may generally be impacted by the transmission power and bandwidth usage of the other wireless communication devices of the network (such as femto base stations 136 and 140 and macro base station 144). Accordingly, the signal performance measurement (e.g., SINR) may incorporate the interference received from surrounding base stations. In some embodiments, endpoint 124 may communicate the signal performance measurement to femto base station 104. In some embodiments, other endpoints (such as 128) that communicate with femto base station 104 may communicate a similar measurement. In some embodiments, femto base station 104 (or other suitable network component) may assimilate multiple signal performance measurements from its endpoints into one signal performance measurement which can be designated for exemplary purposes as $SINR_i$. Femto base station 104 may use any suitable method for assimilating signal performance measurements, such as averaging.

In some embodiments, the signal performance measurement may be used to determine a data throughput of femto base station 104. The data throughput is indicative of the quality of service provided by femto base station 104 and may depend in part on the frequency bandwidth and signal performance of femto base station 104. The data throughput may be determined in any suitable manner. For example, femto base station 104 may track an amount of data transmitted by femto base station 104 over a period of time. As another example, in some embodiments, a data throughput ($R_i$) of femto base station 104 may be approximated using the Shannon channel capacity. For example:

$$R_i = w_i \ln(1 + \beta \cdot SINR_i)$$

where $0 < \beta < 1$ may represent the gap between the realized modulation and coding scheme (MCS) and the Shannon capacity. In some embodiments, the performance measurement may comprise the bandwidth and data throughput. The performance measurement may be sent to server 152 for determining potential future network tuning constant adjustments.

In some embodiments, femto base station 104 may calculate its own data throughput $R_i$. In other embodiments, femto base station 104 may communicate its frequency bandwidth $w_i$ and $SINR_i$ to another node (such as server 152) for calculation of the data throughput $R_i$.

In some embodiments, the data throughput $R_i$ and frequency bandwidth $w_i$ of femto base station 104 over a time interval t may be used to calculate a frequency bandwidth for femto base station 104 to use during a next interval t+1 of wireless communication with its one or more endpoints. In some embodiments, femto base station 104 may try to maximize a net utility function $NU_i$ based on the data throughput $R_i$ of femto base station 104 and a cost per unit of frequency bandwidth $c_i$ used by femto base station 104. For example, the net utility of femto base station 104 may be represented as:

$$NU_i(w_i, R_i) = U_i(R_i(w_i)) - c_i w_i$$

where $U_i(R_i(w_i))$ is the utility of the data throughput $R_i$ of femto base station 104 when it uses frequency bandwidth $w_i$. Thus, the net utility may be based on the data throughput $R_i$ at a given frequency bandwidth $w_i$ and the cost $c_i$ of using the frequency bandwidth $w_i$. In some embodiments, the cost $c_i$ may influence the net utility that femto base station 104 provides when the femto base station uses frequency bandwidth $w_i$ to communicate with its endpoints. In some embodiments, the cost $c_i$ is a value configured to discourage excessive use of frequency bandwidth by femto base station 104. As an example, if there was no cost $c_i$ associated with frequency bandwidth usage, each femto base station might try to maximize its own utility by using all of its available frequency bandwidth. This would likely result in suboptimal system performance due to the excessive interference that would be generated by the femto base stations of the network. In some embodiments, the cost term $c_i$ may be determined and/or supplied by server 152, which in some embodiments may be a SON server.

In some embodiments, the only interaction between base stations (such as femto base stations) in a network may be the interference they cause each other. In some embodiments, a femto base station 104 may adjust its frequency bandwidth $w_i$ to maximize its own net utility. Checking the first order optimality condition by taking the derivative of the net utility equation with respect to $w_i$ (and keeping in mind the constraint $0 \le w_i \le 1$) yields the following result, hereafter referred to as "Result A":

$$w_i^* = \min\left(\frac{1}{\ln(1 + \beta \cdot SINR_i(W^*))} f^{-1}\left(\frac{c_i}{\ln(1 + \beta \cdot SINR_i(W^*))}\right), 1\right)$$

where $$f_i(x) = \frac{dU_i(x)}{dx} = U_i'(x),$$

and $W = [w_0, \ldots, w_{N-1}]_T$

Since $SINR_i$ is a function of W, this equation for optimal frequency bandwidth $w_i^*$ does not provide a direct solution to the optimum value of $w_i$. However, it provides the basis for an iterative algorithm of updating $w_i$. In some embodiments, the utility function $U_i$ may be chosen such that it is an increasing and concave function of data throughput $R_i$ of a base station. In particular embodiments, the utility function $U_i$ may be chosen so that iterative updates allow the network to converge to a unique Nash equilibrium W*.

In general, a Nash equilibrium may be a solution set of a game involving two or more players, in which each player is assumed to know the equilibrium strategies of the other players, and in which no player has anything to gain by changing only his or her own strategy unilaterally. In particular embodiments, the process that each base station uses to update its bandwidth usage, based on the bandwidth usage of the other base stations in the network, may be viewed as a non-cooperative game where each player (base station) tries to maximize its own benefit (net utility $NU_i$) by adjusting its strategy $w_i$. Thus, a Nash equilibrium may be the set $W^* = [w^*_0, \ldots, w^*_{N-1}]^T$, where W* satisfies:

$$NU_i(w^*_i, W^*_{-i}) \ge NU_i(w'_i, W^*_{-i})$$

for all $0 \le w'_i \le 1$, $0 \le i \le N-1$.

At W*, each base station has maximized its own net utility $NU_i$ as long as the frequency bandwidth usage by each base station of the network remains constant. Thus, in some embodiments, iterative updates of the frequency bandwidths used by the base stations of a network may allow the network to approach and/or converge to a Nash equilibrium and achieve Pareto optimality. That is, a set that comprises a frequency bandwidth for each base station of the network may approach and eventually converge to a Nash equilibrium.

In some embodiments, the choice of the utility function $U_i$ may allow the network to converge to a Nash equilibrium as the base stations periodically update their respective frequency bandwidths. In general, an iterative algorithm may converge to a unique fixed point if it is a standard function, that is, the algorithm satisfies the conditions of positivity, monotonicity, and scalability. In some embodiments, the utility function may be chosen such that the bandwidth updating algorithm is a standard function, thus allowing convergence. For example, a utility function of the form $$U_i(x) = -a_i x^{-k_i}, a_i > 0, k_i > 0$$

may allow the network to converge to a Nash equilibrium. Utilizing this equation in conjunction with the equation for optimal frequency bandwidth $w^*_i$ listed above (e.g., plugging this equation into Result A) yields an exemplary bandwidth updating algorithm of:

$$w_i^{t+1} = w_i^* = \min\left(\gamma_i \left(\frac{R_i^t}{w_i^t}\right)^{-l_i}, 1\right)$$

where t is the number of the update interval, $$\gamma_i = \left(\frac{\alpha_i k_i}{c_i}\right)^{\left(\frac{1}{k_i+1}\right)}, \text{ and } l_i = \frac{k_i}{k_i + 1}.$$

In some embodiments, $a_i$ may equal one. In other embodiments, $a_i$ may be a hysteresis parameter that varies with each update.

In some embodiments, $l_i$ and $y_i$ are network tuning constants that can be tuned to adjust the Nash equilibrium of system 100. In some embodiments, the tuning constants may be configured to effectuate a policy scheme of the system, such as network-wide data throughput, fairness, or other policy consideration. In some embodiments, the network tuning constants may be adjusted based on the network load. These network tuning constants may be supplied and/or calculated in any suitable manner. For example, a base station may be pre-configured (e.g., during manufacturing or before deployment in a network) to use one or more particular network tuning constants. As another example, one or more of these network tuning constants may be supplied by a server, such as server 152. In some embodiments, one or more network tuning constants may be supplied periodically, upon start up of femto base station 104, in response to a triggering event (e.g., when a new femto base station joins wireless network 148), and/or at any other suitable time. The network tuning constants may be updated by any suitable entity, such as server 152. In some embodiments, an update to a network tuning constant may be based on the frequency bandwidth $w_i$ and/or data throughput $R_i$ of a base station over an interval of time t. In various embodiments, a base station of a network may be assigned network tuning constants that are tailored for that particular base station. Thus, in some embodiments, different network tuning constants may be used for different base stations.

In certain embodiments, the network tuning constants $l_i$ and $y_i$ may conform to the following parameters:

$$0 < l_i = \frac{k_i}{k_i + 1} < 1$$

and $$\gamma_i = \left(\frac{k_i}{c_i}\right)^{\frac{1}{k_i+1}} > 0$$

Adjusting l towards 0 will move the equilibrium point towards a resource fair environment in which each base station uses an approximately equal amount of resources (e.g., bandwidth) and adjusting l towards 1 will move the equilibrium point towards a rate fair environment in which each base station provides an approximately equal data rate. Furthermore, increasing $y_i$ for a particular base station may increase the data throughput of the corresponding base station. In certain embodiments, l may be a global network tuning constant and y may be a local network tuning constant. For example, server 152 may determine an appropriate value for l based in part on one or more parameters provided by the WSP. The WSP parameters may relate to a baseline, or standard, performance characteristic for the base stations of the WSP's wireless network. The l network tuning constant may be used to determine a baseline y. Both l and y may then be distributed uniformly to all the base stations within the control of server 152. Server 152 may then further fine tune the performance of specific base stations or groups of base stations by adjusting y for specific base stations or groups of base stations. For example, server 152 may increase y for those base stations associated with a higher subscription level. In some embodiments, the base stations may provide server 152 with their respective data throughput, bandwidth usage, and/ or any other signal performance measurements. These may be used by server 152 to adjust the network tuning constants.

In some embodiments, a frequency bandwidth for femto base station 104 to use during a future time interval t+1 may be calculated using the bandwidth updating algorithm described above. The calculated frequency bandwidth may be based on the data throughput $R_i$ and bandwidth $w_i$ of a previous time interval t, and the network tuning constants $l_i$ and $y_i$. In some embodiments, a table of $X^{-l_i}$ may be pre-computed and stored in memory (e.g., 112 or 160) or storage (e.g., 114 or 164) in order to aid in the computation of $$\left(\frac{R_i}{w_i}\right)^{-l_i}$$

by reducing the operation to a table lookup. This may be particularly helpful when the frequency bandwidth is calculated by a base station (such as femto base station 104), or when server 152 must quickly calculate frequency bandwidths for numerous base stations of a network.

After a frequency bandwidth $w_i$ for the next time interval t+1 has been calculated, the new frequency bandwidth may be used to communicate wirelessly with at least one of endpoints 124 or 128. As with the first frequency bandwidth, the new frequency bandwidth may comprise a plurality of frequency subcarriers that are randomly selected. After a time interval has passed, the frequency bandwidth may be updated again according to the bandwidth updating algorithm. This process may repeat any number of times.

In some embodiments, femto base station 104 may periodically update its frequency bandwidth usage $w_i$ in order to maximize its own net utility. In particular embodiments, the length of the update interval may be long enough for a determination of the data throughput $R_i$ of femto base station 104, while short enough to accommodate changes in the network, such as a change of load or number of endpoints communicating with a base station of the network, the powering up or down of a base station, changes in channel gain of a base station, or changes in noise. In various embodiments, the base stations of a network may update their respective frequency bandwidths synchronously or asynchronously with respect to the other base stations.

FIG. 2 depicts various architectures that may be used for allocating bandwidth in a network. Some embodiments may include a distributed architecture utilizing architecture 200. In a distributed architecture, the nodes 208, 212, and 216 of the network may be responsible for calculating their respective frequency bandwidths. In some embodiments, a node may use any suitable information to calculate a frequency bandwidth, such as its frequency bandwidth and data throughput over a time interval and one or more network tuning constants. In some embodiments, the network tuning constants may be supplied by server 204. After calculating a new frequency bandwidth, the node 208 may use the new frequency bandwidth to communicate with its endpoints. The signal performance value of the new frequency bandwidth may be provided to server 204 for future determinations. The distributed architecture is highly scalable, since each added node is expected to calculate its own frequency bandwidths, thus reducing the load on server 152.

Some embodiments may include a centralized architecture utilizing architecture 200. In a centralized architecture, server 204 may calculate frequency bandwidths for the nodes 208, 212, and 216 of the network. For example, the server 204 may determine a frequency bandwidth set comprising a frequency bandwidth for each of the nodes 208, 212, and 216. In some embodiments, nodes 208, 212, and 216 may report one or more parameters to server 204. For example, node 208 may report its frequency bandwidth $w_i$ and data throughput $R_i$ over a time interval to server 204. The server may use these parameters to calculate new network tuning constants and/or a new frequency bandwidth $w_i$ for node 208.

In some embodiments, server 204 may also use one or more network tuning constants to calculate the frequency bandwidths. In some embodiments, the one or more network tuning constants may be based on the parameters received from one or more of nodes 208, 212, and 216. For example, since server 204 may receive data from various nodes 208, 212, and 216, it may determine that a particular node 208 should have a higher frequency bandwidth and may update one or more network tuning constants accordingly.

In particular embodiments, the Nash equilibrium of the network may be tuned to provide a system preference, such as network-wide data throughput, fairness, or other policy considerations. As the network tuning constants are updated and new frequency bandwidths are calculated, the wireless network may converge on the tuned preferences. In some embodiments, the process of updating the network tuning constants may be transparent to the nodes since they receive the updated frequency bandwidth (which incorporates the network tuning constants). In some embodiments, server 204 may communicate a newly calculated frequency bandwidth to node 208. Node 208 may then use the new frequency bandwidth to communicate with one or more of its endpoints.

Some embodiments may include a hybrid architecture utilizing architecture 200. In a hybrid architecture, nodes 208, 212, and 216 of the network may be responsible for calculating their respective frequency bandwidths and may report one or more parameters to server 204. For example, a node may report its frequency bandwidth $w_i$ and data throughput $R_i$ over a time interval to server 204. In some embodiments, these parameters may be transferred from node 208 to server 204 using a standard network management interface. The server may use these parameters to calculate one or more network tuning constants (such as $l_i$, $y_i$) in any suitable manner, such as that described above with respect to the centralized architecture. The server may then communicate these tuning constants to node 208. Node 208 may then calculate a new frequency bandwidth $w_i$ based on these tuning constants (and a measured data throughput and frequency bandwidth of the node). Node 208 may then use the new frequency bandwidth to communicate with its endpoints.

In comparison with the centralized architecture (where the server may perform the bulk of the calculations), the hybrid approach is more scalable since the individual nodes calculate their respective frequency bandwidths. In the centralized architecture the nodes of the network are not required to implement the bandwidth updating algorithm (and thus nodes that do not have this capability would still be able to update their frequency bandwidth based on values calculated by the server). In both the centralized and hybrid architectures, nodes 208, 212, and 216, and server 204 exchange a minimal amount of data, thus maintaining a low communication overhead.

Some embodiments may include a hierarchical architecture utilizing architecture 250. A hierarchical architecture may comprise various subnets. Each subnet may comprise one of subnet servers 258 or 274 and a plurality of nodes coupled to the subnet server. In some embodiments, each subnet server may be coupled to a central server 254. In some embodiments, a hierarchical architecture may include any number of subnets.

In some embodiments, a subnet may employ a centralized or hybrid architecture as described above. In some embodiments, a subnet server may communicate information received from one or more of its respective nodes to central server 254. For example, subnet server 258 may communicate a frequency bandwidth $w_i$ or a data throughput $R_i$ of a node 262 to central server 254. In some embodiments, a subnet server may determine one or more network tuning constants for its nodes and communicate these network tuning constants to central server 254. In some embodiments, central server 254 may calculate any suitable parameter (such as a frequency bandwidth or a network tuning constant) for any node in its network.

In some embodiments, central server 254 may coordinate the entire network. For example, the central server may manage the radio resources used in the network. In other embodiments, the network-wide coordination may be performed in a distributed manner among the subnet servers.

In some embodiments, any combination of the distributed, hybrid, centralized, and/or hierarchical architectures may be used. For example, a subset of base stations in a network may calculate their own frequency bandwidths, while another subset passes information to a server for the calculation of frequency bandwidths.

FIG. 3 depicts an example of a method for adjusting bandwidth allocations in a wireless network in accordance with particular embodiments. In certain embodiments, the method of FIG. 3 may be performed by a computer, such as the computer described above with respect to server 152. For purposes of simplicity, the steps of FIG. 3 are described from the perspective of a server. The method begins at step 310 where one or more network tuning constants are provided to each base station within a wireless network. The base stations may comprise femto base stations. As discussed in more detail below, the server may use the network tuning constants to adjust an equilibrium point of a first bandwidth allocation among one or more base stations within a WSP's wireless network. The equilibrium point may be a point at which the base stations collectively arrive between resource fare and rate fare. In some embodiments, the network tuning constants may comprise two separate constants. A first network tuning constant may be a global constant that may be uniformly applied to all the base stations within the wireless network. A second network tuning constant may be a local network tuning constant that may be used to fine-tune the data throughput of individual, or groups of base stations.

Depending on the scenario, the network tuning constants may be provided by a server, such as a SON server, or they may be temporary predetermined network tuning constants provided by the supplier of the base station. Regardless of the source of the network tuning constants, the network tuning constants values may comprise a combination of more or more default (e.g. values used at startup), baseline (e.g., standard value set by the WSP), and/or adjusted (e.g., at step 350 below) network tuning constant values. The default network tuning constant values may be the same for each base station. The actual values may be determined by the manufacturer and/or the WSP. The default network tuning constant values may be updated once the base station is able to communicate with the WSP's network. The baseline network tuning constant values may reflect a WSP's standard wireless service level. While the WSP may have a standard wireless service level, the network tuning constant values used to achieve this level may vary over time and between wireless networks based on the situation (e.g., number of users, number of base stations, environmental conditions, etc.). The adjusted network tuning constant values may reflect either local or global adjustments to one or more network tuning constants for one or more base stations. In some cases, the adjusted network tuning constant values may become the baseline network tuning constant values.

At step 320 the server may receive signal performance values from the femto base stations of the wireless network. The signal performance values may indicate a quality of the wireless communication between the base station and the end point. In some embodiments, this may include an efficiency with which data reaches the end point based on the amount of resources used for the wireless connection. The signal performance values may comprise the measured data throughput, the bandwidth usage, information about the strength of the wireless signal, the interference received on the wireless signal, or any other signal performance indicator that may be used by the server to determine network tuning constants, or the efficiency with which the respective femto base station is operating. The signal performance values may be received from individual base stations or subnet servers. The signal performance values may be received on a periodic basis, upon a triggering event, or upon request from the server. It may be the case that the signal performance values may be based on the base stations using a first frequency bandwidth allocation. This may be used by the server to determine whether the network tuning constants need to be adjusted (e.g., at step 330).

At decision step 330 the server determines whether the network tuning constants should be adjusted. The determination to adjust the network tuning constants may be based on any of a variety of factors. For example, in some embodiments, the network tuning constants may be adjusted upon determining that the current wireless network performance is above or below a predetermined threshold (e.g., the based on the WSP's standard service level). As another example, the network tuning constants may be adjusted in response to receiving a request from the wireless service provider, or an operator, to adjust the performance of one or more base stations within the wireless network. In some scenarios, the adjustment may be made to only a subset of base stations, or other base stations, within the wireless network. For example, the wireless service provider may request a temporary increase to the data throughput of certain base stations in response to a large convention or other special event being scheduled. In such a situation, the server may determine that it needs to adjust the network tuning constants of the base stations owned by the convention center and any neighboring businesses so as to increase their data throughput. As another example, the wireless service provider may provide two or more different classes of service for wireless connections. The base stations associated with these different classes of service may have different sets of network tuning constants. When a user changes service levels, the server may adjust the network tuning constants for the corresponding base station.

At step 340 the server determines the adjustment to be made to the network tuning constants. In some embodiments, the server may determine which network tuning constants to adjust, the extent with which the determined network tuning constants should be adjusted, and for which base stations the network tuning constants should be adjusted. In some embodiments, where the server is adjusting a subset of base stations the server may also determine the impact on the remaining base stations. It may then adjust all the base stations. For example, once the server has determined a local parameter for the subset of base stations, the server may then readjust the global parameter for all the base stations. In certain embodiments, the server may determine whether to adjust both the global parameter and the local parameter for the network tuning constants, or simply to adjust the local parameter for a select subset of base stations.

In certain embodiments, the base stations may use the following equation to determine their resource use:

$$w_i^{t+1} = w_i^* = \min\left(\gamma_i \left(\frac{R_i^t}{w_i^t}\right)^{-l_i}, 1\right).$$

In such an embodiment, a global parameter (e.g., $l_i$) may be moved towards zero to adjust the equilibrium point towards a resource fair allocation of wireless resources and towards one to adjust the equilibrium point towards a rate fare allocation of wireless resources. In addition, a local parameter (e.g., $y_i$) may be increased to increase the data throughput of the corresponding base station. In some scenarios, the server may determine whether to adjust the equilibrium point towards a rate fare or a resource fare equilibrium point. This determination may help in determining how to adjust one or more of the network tuning constants. For example, the server may compare the current equilibrium point with a predetermined equilibrium point to determine how large of an adjustment needs to be made to a global parameter. As another example, the WSP may generate an adjustment request if it determines that its macro base stations are experiencing too much interference from deployed femto base stations. The server may receive this request and adjust the local, global, or both network tuning constants so as to reduce the amount of wireless resources used by the deployed femto base stations.

At step 350 the server adjusts the network tuning constants based on the signal performance values. The signal performance values may be used in determining how much of an adjustment to make. The signal performance values may also be used in determining the network tuning constants to update for which base stations. For example, if a particular base station is not performing well, the server may adjust a local network tuning constant for that base station to attempt to improve its performance. Along with the signal performance values received at step 310, the server may also use any other information indicative of how the network tuning constants are to be adjusted. For example, the server may use information about upcoming events. Once the server has determined and made the adjustments to the network tuning constants, the method may return to step 310 and the updated network tuning constants may be provided to the base stations. The steps of the method depicted in FIG. 3 may be repeated (e.g., periodically or upon detecting a triggering event, such as detecting a new endpoint) for as long as the WSP is operating the wireless network.

While the embodiment depicted in FIG. 3 includes a certain number of steps, depicted in a certain order, it is to be understood that other embodiments may have more, fewer or different steps, and the steps may be rearranged or performed simultaneously. For example, in some embodiments, the server may initially determine that the network tuning constants do not need to be adjusted, but then may receive a request to change one or more network tuning constants before the server receives additional signal information. In other words, the "No" branch from decision step 330 may loop back to decision step 330, not step 320.

The embodiments that this disclosure (including all attachments hereto) describes or illustrates are examples, and they do not limit the scope of this disclosure. This disclosure encompasses all changes, substitutions, variations, alterations, and modifications to the example embodiments herein that a person having ordinary skill in the art would comprehend.

Modifications, additions, or omissions may be made to the systems and apparatuses disclosed herein without departing from the scope of this disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising non-transitory, tangibly stored software, hardware, and/or other encoded logic. As used in this document, "each" refers to each member of a set or each member of a subset of a set.

Modifications, additions, or omissions may be made to the methods disclosed herein without departing from the scope of this disclosure. The method may include more, fewer, or other steps. Additionally, steps may be performed in any suitable order.

A component of the systems and apparatuses disclosed herein may include an interface, logic, memory, and/or other suitable elements. An interface receives input, sends output, processes the input and/or output, and/or performs other suitable operation. An interface may comprise hardware and/or software.

Logic may perform the operations of the component, for example, it may execute instructions to generate output from input. Logic may include hardware, software, and/or other logic. Logic may be encoded in one or more non-transitory and tangible media and may perform operations when executed by a computer or a processor. Certain logic, such as a processor, may manage the operation of a component. Examples of a processor include one or more computers, one or more microprocessors, one or more applications, and/or other logic.

In particular embodiments, the operations of the embodiments may be performed by one or more tangible and non-transitory computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
    providing one or more network tuning constants associated with one or more base stations of a wireless network, the network tuning constants configured to adjust an equilibrium point of a first bandwidth allocation among the one or more base stations;
    receiving one or more signal performance values from each of the one or more base stations in the wireless network;
    determining whether at least one of the one or more network tuning constants needs to be adjusted; and
    upon determining that at least one of the one or more network tuning constants needs to be adjusted, adjusting the one or more network tuning constants based at least in part on the one or more signal performance values.

2. The method of claim 1, wherein the one or more network tuning constants comprises at least a first network tuning constant and at least a second network tuning constant, the first network tuning constant a global network tuning constant comprising a common value for each of the one or more base stations and the second network tuning constant a local network tuning constant that differs between at least two of the one or more base stations.

3. The method of claim 1, wherein adjusting the one or more network tuning constants comprises adjusting the one or more network tuning constants to move the equilibrium point towards a rate fair equilibrium point.

4. The method of claim 1, wherein adjusting the one or more network tuning constants comprises adjusting the one or more network tuning constants to move the equilibrium point towards a resource fair equilibrium point.

5. The method of claim 1:
    further comprising receiving a request to adjust the one or more network tuning constants of a subset of the one or more base stations; and
    wherein adjusting the one or more network tuning constants is further based on the request to adjust the one or more network tuning constants of a subset of the one or more base stations.

6. The method of claim 1, further comprising receiving a request to adjust the equilibrium point of the first bandwidth allocation among the one or more base stations.

7. The method of claim 1:
    further comprising comparing the equilibrium point of the first bandwidth allocation to a predetermined equilibrium point, and
    wherein determining whether at least one of the one or more network tuning constants needs to be adjusted is further based on the comparison of the equilibrium point of the first bandwidth allocation to a predetermined equilibrium point.

8. A system comprising:
    an interface configured to:
        provide one or more network tuning constants associated with one or more base stations of a wireless network, the network tuning constants configured to adjust an equilibrium point of a first bandwidth allocation among the one or more base stations; and
        receive one or more signal performance values from each of the one or more base stations in the wireless network; and
    a processor coupled to the interface and configured to:
        determine whether at least one of the one or more network tuning constants needs to be adjusted; and
        upon determining that at least one of the one or more network tuning constants needs to be adjusted, adjust the one or more network tuning constants based at least in part on the one or more signal performance values.

9. The system of claim 8, wherein the one or more network tuning constants comprises at least a first network tuning constant and at least a second network tuning constant, the first network tuning constant a global network tuning constant comprising a common value for each of the one or more base stations and the second network tuning constant a local network tuning constant that differs between at least two of the one or more base stations.

10. The system of claim 8, wherein the processor configured to adjust the one or more network tuning constants is further configured to adjust the one or more network tuning constants to move the equilibrium point towards a rate fair equilibrium point.

11. The system of claim 8, wherein the processor configured to adjust the one or more network tuning constants is further configured to adjust the one or more network tuning constants to move the equilibrium point towards a resource fair equilibrium point.

12. The system of claim 8, wherein:
   the interface is further configured to receive a request to adjust the one or more network tuning constants of a subset of the one or more base stations; and
   the processor is further configured to adjust the one or more network tuning constants based on the request to adjust the one or more network tuning constants of a subset of the one or more base stations.

13. The system of claim 8, wherein the interface is further configured to receive a request to adjust the equilibrium point of the first bandwidth allocation among the one or more base stations.

14. The system of claim 8, wherein:
   the processor is further configured to compare the equilibrium point of the first bandwidth allocation to a predetermined equilibrium point, and
   wherein the processor configured to determine whether at least one of the one or more network tuning constants needs to be adjusted based on the comparison of the equilibrium point of the first bandwidth allocation to a predetermined equilibrium point.

15. Logic embodied in a tangible and non-transitory computer readable medium that when executed is configured to:
   provide one or more network tuning constants associated with one or more base stations of a wireless network, the network tuning constants configured to adjust an equilibrium point of a first bandwidth allocation among the one or more base stations;
   receive one or more signal performance values from each of the one or more base stations in the wireless network;
   determine whether at least one of the one or more network tuning constants needs to be adjusted; and
   upon determining that at least one of the one or more network tuning constants needs to be adjusted, adjust the one or more network tuning constants based at least in part on the one or more signal performance values.

16. The logic of claim 15, wherein the one or more network tuning constants comprises at least a first network tuning constant and at least a second network tuning constant, the first network tuning constant a global network tuning constant comprising a common value for each of the one or more base stations and the second network tuning constant a local network tuning constant that differs between at least two of the one or more base stations.

17. The logic of claim 15, configured to adjust the one or more network tuning constants is further configured to adjust the one or more network tuning constants to move the equilibrium point towards a rate fair equilibrium point.

18. The logic of claim 15, configured to adjust the one or more network tuning constants is further configured adjust the one or more network tuning constants to move the equilibrium point towards a resource fair equilibrium point.

19. The logic of claim 15, further configured to:
   receive a request to adjust the one or more network tuning constants of a subset of the one or more base stations; and
   adjust the one or more network tuning constants based on the request to adjust the one or more network tuning constants of a subset of the one or more base stations.

20. The logic of claim 15, further configured to receive a request to adjust the equilibrium point of the first bandwidth allocation among the one or more base stations.

21. The logic of claim 15, further configured to:
   compare the equilibrium point of the first bandwidth allocation to a predetermined equilibrium point, and
   determine whether at least one of the one or more network tuning constants needs to be adjusted based on the comparison of the equilibrium point of the first bandwidth allocation to a predetermined equilibrium point.

* * * * *